No. 835,774. PATENTED NOV. 13, 1906.
G. P. BRAND.
AIR TENSION MOTOR.
APPLICATION FILED JAN. 15, 1904.
4 SHEETS—SHEET 1.
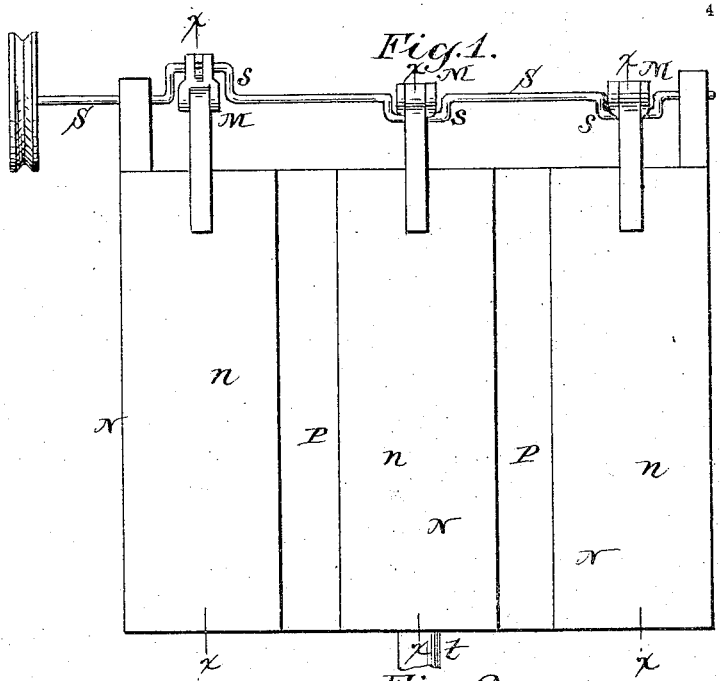
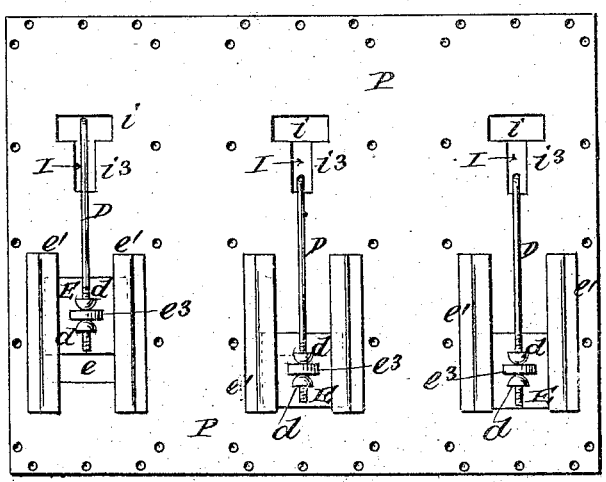

No. 835,774. PATENTED NOV. 13, 1906.
G. P. BRAND.
AIR TENSION MOTOR.
APPLICATION FILED JAN. 15, 1904.

4 SHEETS—SHEET 2.

Witnesses:
D. W. Gardner
T. Beal

Inventor:
George P. Brand
By his Attorney
Geo. Wm. Miatt

No. 835,774. PATENTED NOV. 13, 1906.
G. P. BRAND.
AIR TENSION MOTOR.
APPLICATION FILED JAN. 15, 1904.

4 SHEETS—SHEET 3.

Witnesses:
O. W. Gardner.
T. Beal.

Inventor:
George P. Brand
By his Attorney
Geo. Wm. Miatt

No. 835,774. PATENTED NOV. 13, 1906.
G. P. BRAND.
AIR TENSION MOTOR.
APPLICATION FILED JAN. 15, 1904.

4 SHEETS—SHEET 4.

Witnesses:
D. W. Gardner.
T. Beal.

Inventor:
George P. Brand
By his Attorneys

UNITED STATES PATENT OFFICE.

GEORGE P. BRAND, OF NEW YORK, N. Y.

AIR TENSION-MOTOR.

No. 835,774.  Specification of Letters Patent.  Patented Nov. 13, 1906.

Application filed January 15, 1904. Serial No. 189,101.

*To all whom it may concern:*

Be it known that I, GEORGE P. BRAND, a citizen of the United States, residing in the city of New York, borough of Manhattan, county and State of New York, have invented certain new and useful Improvements in Air Tension-Motors, of which the following is a specification sufficient to enable others skilled in the art to which the invention appertains to make and use the same.

My invention relates to pneumatic motors actuated primarily by the withdrawal of air therefrom by reason of their connection indirectly, through the medium of valve-controlled ports with tension or exhaust mechanism, and is applicable to the feeding of music-sheets to a tracker-board and analogous uses in which a light compact easy-running motor is a desideratum.

Hence the main object of my invention is to economize space and at the same time simplify and cheapen the construction of the motor as a whole.

The distinguishing feature of my invention consists in providing each pneumatic forming a component part of the motor with a solid port-plate and with valves controlling said ports arranged to travel on opposite sides of said solid port-plate, those controlling the outlet or tension ports being arranged within the pneumatics, while those controlling the inlet or air ports are situated externally thereto; but while the outlet-valves are thus situated within the pneumatics when the latter are secured in place upon the port-plate they are entirely independent of the said pneumatics in so far as support is concerned, both sets of valves being mounted directly upon said port-plate and the inner or stationary side of each pneumatic consisting simply of a frame which is detachably secured to the port-plate, the pneumatics being thus made detachable so as to give access to the discharge-valves for the purpose of adjustment, &c.

My invention also includes certain other features in the construction and arrangement of parts hereinafter described and claimed specifically.

Figure 3:
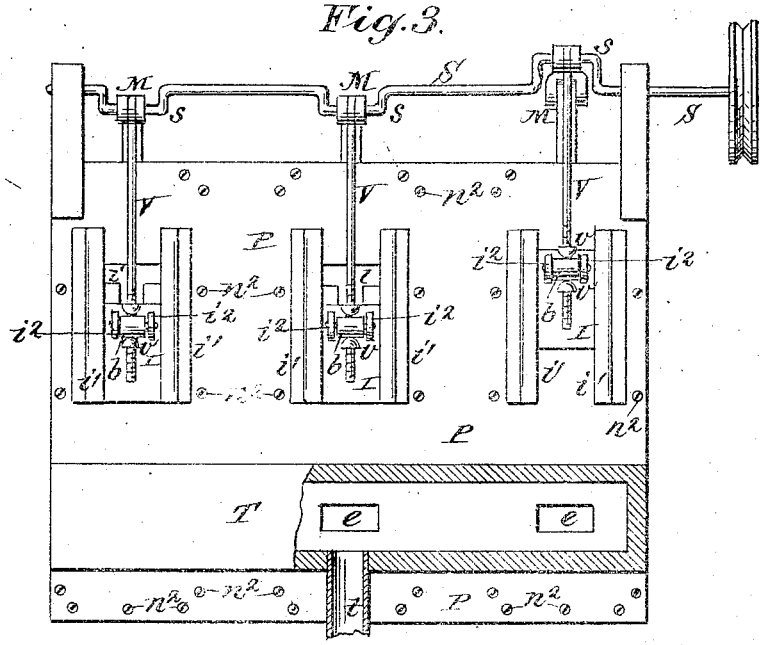
Figure 4:
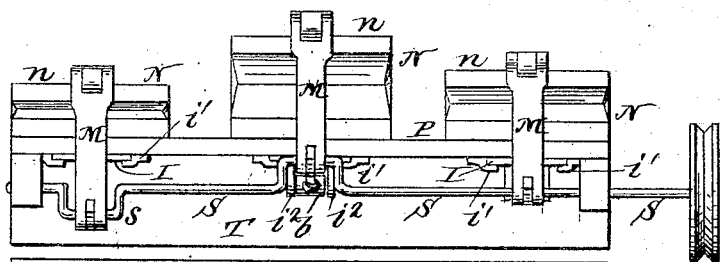
Figure 5:
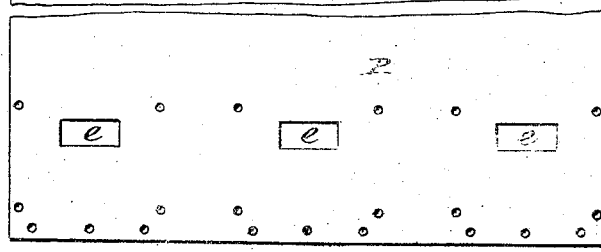
Figure 6:
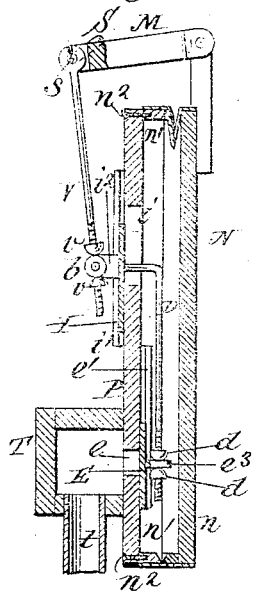
Figure 7:
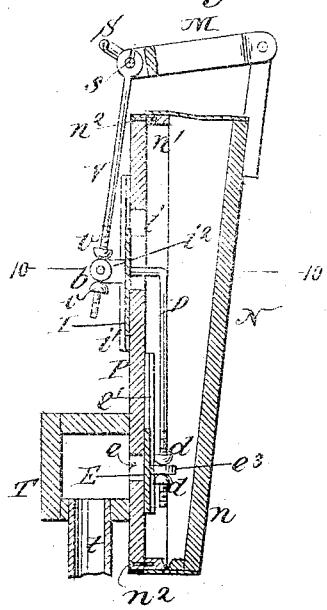
Figure 8:
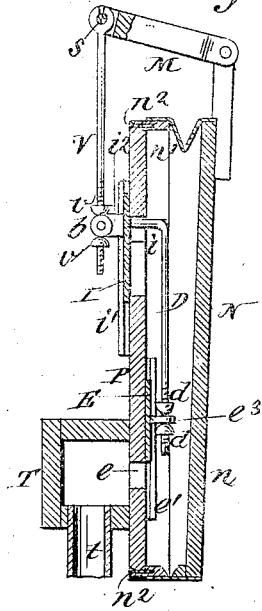
Figure 9:
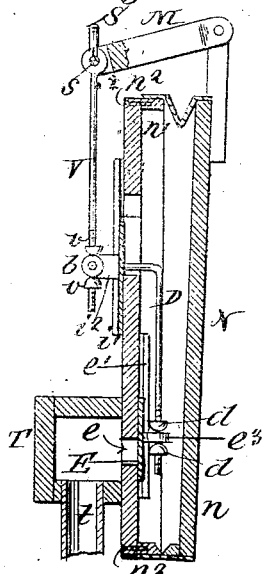
Figure 10:
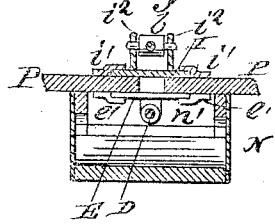
Figure 12:
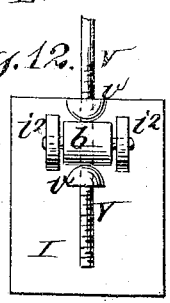
Figure 11:
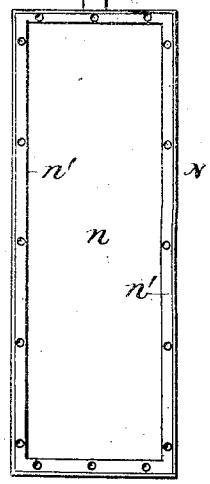
Figure 13:
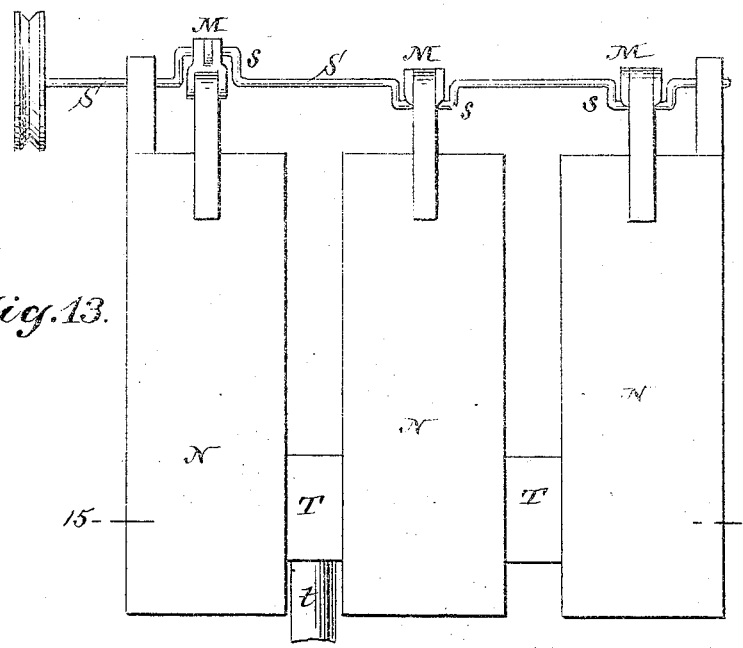
Figure 15:
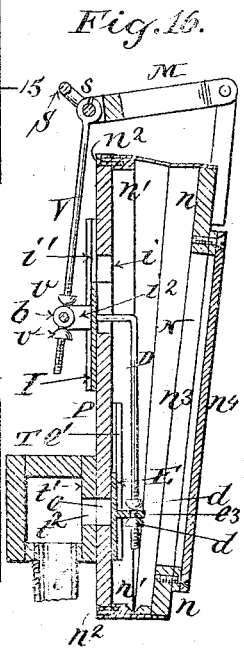
Figure 14:
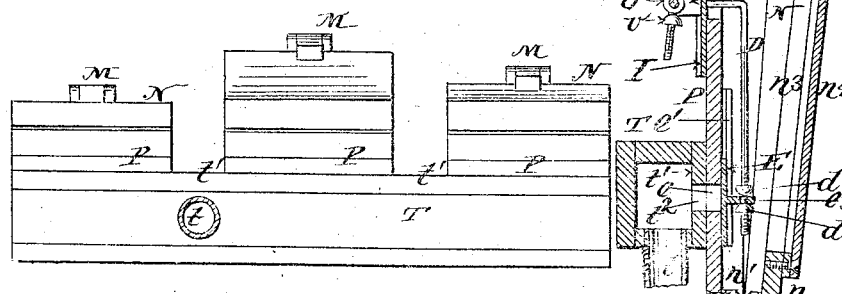
Figure 15:
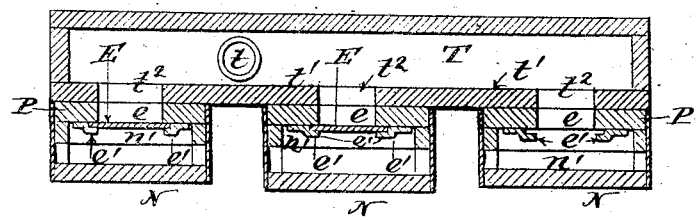

In the accompanying drawings, Figure 1 is a front view of my improved motor. Fig. 2 is an elevation of the front side of the port-plate, the pneumatics being removed. Fig. 3 is a rear view of the motor, partly in section. Fig. 4 is a top view of the same; Fig. 5, a rear elevation of the port-plate broken away centrally. Figs. 6, 7, 8, and 9 are sections upon plane of lines *x x*, Fig. 1. Fig. 10 is a transverse section on plane of line 10 10, Fig. 7. Fig. 11 is an elevation of the inner side of one of the pneumatics. Fig. 12 is a view, upon an enlarged scale, of one of the valve-rod connections. Fig. 13 is an elevation similar to Fig. 1, showing each pneumatic formed with an individual port-plate. Fig. 14 is a view of the lower edge of the motor and tension-chest; Fig. 15, a view upon plane of line 15 15, Fig. 13. Fig. 16 is a sectional view showing a modification of one of the pneumatics in a position similar to Fig. 7.

In my reference to the drawings forming a part of this application I use the terms "front," "rear," "top," &c., for convenience of description, it being understood that the motor as a whole may be arranged in any desired position or at any inclination to suit the requirements of use. I have also herein shown and described the motor as composed of three pneumatics and connections, although any plural number thereof may be used in conjunction. Furthermore, minor details may be modified in form or structure or mechanical expedients substituted with like result and without departing from the spirit and intent of my invention in this respect.

It may be said that the basis of my improved structure is the solid port-plate P, whether made individual to each pneumatic or common to the whole number of pneumatics forming component parts of the motor, the said port plate or plates being made without chamber or opening save for the inlet-ports *i* and exhaust-ports *e*, as hereinafter set forth. Thus in Figs. 1 to 10, inclusive, the plate P is shown as sufficiently large in area to accommodate all three of the pneumatics N and constitute what may be designated as a "common port-plate" for the same, whereas in Figs. 13 to 16, inclusive, the use of individual port-plates is shown, the result being practically the same in either arrangement, although both afford special advantages for special uses, since while the common port-plate is the simpler and stronger form the individual port-plate is better adapted to climates and conditions that would tend to warp the wood of which both forms are preferably composed.

Referring to the first ten figures of the drawings, the solid common port-plate P is formed with a series of inlet-ports *i* and a series of exhaust-ports $e$, one of each for every bellows N used. A tension-chest T, secured to the rear of the port-plate P, incloses the exhaust-ports $e$ on that side of the plate, said tension-chest T being connected by a conduit or trunk $t$ with air-exhaust mechanism of any desired character. The movable side of each pneumatic N consists, ordinarily, of a plain continuous board or plate $n$ without opening of any kind, while the stationary side is essentially a frame $n'$ by which the pneumatic is attached to the port-plate P by screws $n^2$ to the frame $n'$, inclosing a large area of the front side of the port-plate P, in which area is situated one of the exhaust-port valves E. Each exhaust-port valve E consists of a slide held between guideways $e'$ $e'$, and the inlet-valves I on the opposite side of the port-plate P are of like structure and are held between guideways $i'$ $i'$. The exhaust-port valve E and the inlet-valve I for each pneumatic N are coupled together by means of a connection rod D, rigidly secured to one slide and adjustably secured to the other. As a matter of convenience I prefer to attach the connecting-rod D rigidly to the inlet-valve I and adjustably to the exhaust-valve E, as shown in the drawings, although, of course, this arrangement is not imperative and might be reversed. The adjustable connections may be attained, as shown in the drawings, by threading the free end of the connection rod D and providing it with nuts $d$ $d$ for engagement with a stud or shoulder $e^3$ on the exhaust-valve, the whole purpose of the adjustment being to regulate with accuracy the relative timing of the valves, so that one shall close before the other opens, and vice versa, whereby the alternate inflation and deflation of the pneumatic is assured without loss of power. The inlet-ports $i$ are T-shaped, as will be seen by reference more particularly to Figs. 2 and 5, the lateral extension $i^3$ of the port-slot $i$ being made to afford clearance for the connection rod D. The pair of valves I E being thus coupled together by the rod D, necessarily travel simultaneously and are reciprocated by a crank 6 or other mechanical expedient on the driver-shaft S as an eccentric, for instance, through the medium of a valve-rod V. In order to obviate as far as possible all torsional or other strain in the connection between valves and crank-shaft, I employ special means for coupling the valve-rods V to the inlet-valves I. Thus a trunnioned coupling-block $b$ is pivotally supported between lugs or standards $i^2$ $i^2$ on the valve-slide I, the coupling-block $b$ being perforated to receive the threaded end of the valve-rod V, which latter carries nuts $v$ $v$, which bear upon opposite sides of the coupling-block $b$ and by their adjustment on the valve-rod time the valves I E with relation to their ports $i$ $e$. It will be seen that I thus attain practically an articulated joint-coupling between the parts, since the trunnions of the coupling-block $b$ admit of free axial play while the freedom of the valve-rod to turn on its longitudinal axis, owing to the fact that it merely passes through the coupling-block and is not bound rigidly thereto by the nuts $v$ $v$, prevents torsional, longitudinal, or lateral strain, which would result in undue or uneven pressure upon the inlet-valve I. Hence I insure an ease and freedom of movement of the latter and its companion exhaust-valve that reduces to the minimum the frictional resistance afforded to the operation of the motor and renders it practically noiseless, while increasing its life and durability.

The flexing side $n$ of each pneumatic N is connected by a pitman M with a crank $s$ upon the driver-shaft S, and a preferred construction is to connect both the pitman M and the valve-rod V to the same crank $s$, as shown in the drawings, although I do not restrict myself to this construction, since separate cranks or their mechanical equivalents may obviously be provided with like result, if desired. When pitman and valve-rod are connected to the same crank $s$, I prefer to bifurcate either the valve-rod or the pitman, so that both shall occupy and operate in the same plane. Thus in the drawings the end of the pitman is bifurcated to receive the end of the valve-rod.

It will be seen that the foregoing description applies to the pneumatics whether applied to a common solid port-plate or to individual port-plates, as in the last four figures of the drawings, the only practical difference in the latter case, aside from the fact that the common port-plate is simply subdivided being that the back or bottom plate $t'$ of the tension-chamber T is made continuous for its whole length and is formed with exit-ports $t^2$, connecting with the ports $e$ in the several port-plates P, as will be understood by reference to Fig. 16. In this case each solid port-plate P constitutes practically the stationary member of the pneumatic, and, if preferred, it may be actually made so, the bellows-leather being attached directly to its edges and a manhole $n^3$, closed by a plate $n^4$, being provided to give access to the interior for the adjustment of the exhaust-valve E, &c.

It is to be understood that the cranks $s$ of the shaft S break joints or project at different angles to obviate a dead-center, the relative angles depending upon the number of pneumatics used, as heretofore.

By the use of my solid plain port-plate with no chambers or openings save the inlet and exhaust ports I attain a compact rigid structure, while dispensing with valve-chambers or other direct means of communication between the pneumatic and the atmosphere on one side and between the pneumatic and the tension-chest on the other. In this connection attention may be called to the great economy in space attained by my compact structure of motor, owing mainly to the use of the comparatively thin flat port-plate and the location of the exhaust-valve within the pneumatic. Taken in connection with mechanical piano-players particularly this reduction of the area required to accommodate the motor is of importance from both a commercial and artistic point of view.

The simplicity of my structure is an important factor both from a commercial and practical point of view, since the cost of manufacturing the motor is reduced, while its efficiency is increased, as has been demonstrated by practical test and experiment. Furthermore, after being put together and properly timed it requires little or no attention in the way of subsequent adjustment or repair, although it is so constructed that access may be quickly and conveniently had to any part, if necessary.

I am aware that in the structure shown in Patent No. 692,194, dated January 28, 1902, to C. J. Davis, on which my invention is an improvement, a series of pneumatics are arranged to actuate a driver-shaft which in turn operates inlet and exhaust valves; but in that case each pneumatic is inflated and deflated indirectly through a single port connected with a valve-chest from which the air has alternately to be exhausted and admitted, so that the operation of the pneumatic is thus rendered unnecessarily slow, since the pneumatic must have time to respond to the change of tension in the valve-chest, whereas in my construction I designedly dispense with a valve-chest and control the tension in the pneumatic through separate inlet and exhaust ports opening directly into the pneumatic, so that the change of tension therein is practically instantaneous, and consequently more effective. Furthermore, there are other practical distinctions of structure herein described and claimed specifically which distinguish my invention from the prior state of the art.

What I claim as my invention, and desire to secure by Letters Patent, is—

1. In an air tension-motor the combination, with a pneumatic, of a solid port-plate formed with inlet and exhaust ports, a valve for the exhaust-port situated within the pneumatic and a valve for the inlet-port situated externally thereto, the two valves being coupled together by a connection passing through a slot in the port-plate, and being operated through suitable connections by a crank on a driver-shaft connected with the pneumatic, said driver-shaft, and a tension-chest communicating directly with the said exhaust-port.

2. In an air tension-motor, the combination with a pneumatic, of a solid port-plate formed with inlet and exhaust ports, a valve for the exhaust-port situated within the pneumatic and a valve for the inlet-port situated externally thereto, the two valves being coupled together by a connection passing through a slot in the port-plate, and being operated through suitable connections by a crank on a driver-shaft connected with the pneumatic, means for adjusting the two said valves with relation to each other, said driver-shaft, and a tension-chest communicating directly with the said exhaust-port.

3. In an air tension-motor, a solid port-plate formed with inlet and exhaust ports, a pneumatic the stationary side of which consists of a frame for attachment to the said solid port-plate, a valve for the exhaust-port situated within the pneumatic and within the area inclosed by its said side frame, a valve for the inlet-port situated externally to said pneumatic, the two said valves being coupled together by a connection passing through a slot in the port-plate and being operated through suitable connections by a crank on a driver-shaft connected with the pneumatic, said driver-shaft, and a tension-chest communicating directly with the said exhaust-port.

4. In an air tension-motor, the combination of a pneumatic, a solid port-plate formed with inlet and exhaust ports, a valve for the exhaust-port situated within the pneumatic, and a valve for the inlet-port situated externally thereto, the two valves being coupled together by a connection passing through a slot in the port-plate, and being connected by means of an articulated coupling and valve-rod with a crank on a driver-shaft connected with the pneumatic, said driver-shaft, and a tension-chest communicating directly with the said exhaust-port.

5. In an air tension-motor, a solid port-plate formed with inlet and exhaust ports, a pneumatic attached to one side of said port-plate, a valve for the exhaust-port situated in said pneumatic, a manhole and cover on the movable side of said pneumatic for the purpose of giving access to said exhaust-valve and connections, a valve for the inlet-port situated externally to said pneumatic, the said two valves being coupled together by a connection passing through a slot in the port-plate and being operated through suitable connections by a crank on a driver-shaft connected with the pneumatic, said driver-shaft, and a tension-chest communicating directly with the exhaust-port.

6. In an air tension-motor, the combination with a pneumatic, of a solid port-plate formed with inlet and exhaust ports, a valve for the exhaust-port situated within the pneumatic, a valve for the inlet-port situated externally to said pneumatic, the said two valves being coupled together by a connection passing through a slot in the port-plate and being connected by a valve-rod with a crank on a driver-shaft, said crank being also connected by a pitman with the pneumatic, said driver-shaft, and a tension-chest communicating directly with the exhaust-port.

7. In an air tension-motor, the combination of a plurality of pneumatics, a solid port-plate common to all of said pneumatics and having separate inlet and outlet ports for each pneumatic and directly connected therewith, valves controlling said ports one of said valves being disposed within each pneumatic, and means for operating said valves.

8. In an air tension-motor, the combination of a plurality of pneumatics, a solid port-plate common to all of said pneumatics and having separate inlet and outlet ports for each pneumatic and directly connected therewith, valves controlling said ports one of said valves being disposed within each pneumatic, means for operating said valves, and a tension-chest mounted on said port-plate and into which the exhaust-ports in the said port-plate open direct.

9. In a pneumatic motor, the combination with a plurality of pneumatics, of a solid port-plate common to all the pneumatics and formed with inlet and exhaust ports for each pneumatic, together with valves for controlling said ports, the exhaust-valves being situated within the pneumatics and the inlet-valves being situated externally thereto, each pair of inlet and exhaust valves being coupled together by a connection passing through a slot in the port-plate, and being operated through suitable connections by cranks on a driver-shaft, and a tension-chest communicating directly with the exhaust-ports.

10. In an air tension-motor, the combination of a plurality of pneumatics, a solid port-plate common to all of the pneumatics and having separate inlet and outlet ports for each pneumatic and directly connected therewith, valves controlling said ports one of said valves being disposed within each pneumatic, means for operating said valves, and a tension-chest mounted on said port-plate and into which and the pneumatics said exhaust or outlet ports in said port-plate open direct.

11. In an air tension-motor, the combination with a plurality of pneumatics, of a tension-chest into which the exhaust-ports of the pneumatics directly open, said ports opening also directly into the pneumatics, valves controlling said ports one of said valves being disposed within each pneumatic, and means for operating the valves.

12. In an air tension-motor, the combination of a plurality of pneumatics, each communicating with a plurality of ports leading directly thereinto, and valves connected to move in unison, one within the pneumatic and the other external thereto, for controlling said ports.

13. In an air tension-motor, the combination of a plurality of pneumatics, each communicating with a plurality of ports leading thereinto, a wind-chest, and valves controlling said ports, connected to move in unison, one of said valves being disposed between its port and the movable part of the pneumatic and outside the wind-chest.

14. In an air tension-motor, the combination of a plurality of pneumatics, each communicating with a plurality of ports leading thereinto, a wind-chest, and valves connected to move in unison for controlling said ports, one of said ports being disposed between the wind-chest and the valve which controls it, and one of the said valves disposed within the pneumatic and the other outside thereof.

GEORGE P. BRAND.

Witnesses:
D. W. GARDNER,
GEO. WM. MIATT.